(12) United States Patent
Bajpay et al.

(10) Patent No.: US 7,774,237 B1
(45) Date of Patent: Aug. 10, 2010

(54) METHODS FOR IDENTIFYING AND REVISING HIGH-RISK ORDERS BASED ON IDENTIFIED ERRORS

(75) Inventors: Paritosh Bajpay, Edison, NJ (US); Roberta Ann Bienfait, Norcross, GA (US); Kathleen M. Clarke, Heathrow, FL (US); Hossein Eslambolchi, Los Altos Hills, CA (US); Daqin Liu, Morganville, NJ (US); Jackson Liu, Middletown, NJ (US); John McCanuel, Bailey, CO (US); Arnel R. Pajarillo, Edison, NJ (US); Chen-Yui Yang, Marlboro, NJ (US); Michael Zinnikas, North Brunswick, NJ (US); Wan-Ping Chiang, Colts Neck, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1136 days.

(21) Appl. No.: 11/316,018

(22) Filed: Dec. 22, 2005

(51) Int. Cl.
G06Q 30/00 (2006.01)
G06F 17/30 (2006.01)

(52) U.S. Cl. .............................. 705/26; 705/27; 705/80

(58) Field of Classification Search .................... 705/1, 705/26–28, 80
See application file for complete search history.

(56) References Cited

U.S. PATENT DOCUMENTS

| | | | |
|---|---|---|---|
| 4,799,156 A | 1/1989 | Shavit et al. | |
| 4,897,867 A | 1/1990 | Foster et al. | |
| 5,361,199 A | 11/1994 | Shoquist et al. | |
| 5,666,493 A | 9/1997 | Wojcik et al. | |
| 5,808,894 A | 9/1998 | Wiens et al. | |
| 5,942,986 A | 8/1999 | Shabot et al. | |
| 6,202,053 B1 | 3/2001 | Christiansen et al. | |
| 6,850,643 B1 | 2/2005 | Smith, II et al. | |
| 6,931,380 B2 | 8/2005 | Shedd et al. | |
| 6,937,993 B1 | 8/2005 | Gabbita et al. | |
| 7,606,742 B2* | 10/2009 | Bright et al. ................... | 705/28 |
| 2002/0010686 A1* | 1/2002 | Whitesage ..................... | 705/80 |
| 2002/0013731 A1* | 1/2002 | Bright et al. ................... | 705/22 |
| 2002/0188496 A1* | 12/2002 | Feldman et al. ................ | 705/10 |
| 2004/0039693 A1* | 2/2004 | Nauman et al. ................ | 705/39 |
| 2004/0186798 A1* | 9/2004 | Blitch et al. ................... | 705/29 |
| 2005/0015319 A1* | 1/2005 | Guler et al. .................... | 705/35 |
| 2006/0095830 A1* | 5/2006 | Krishna et al. .............. | 715/500 |

OTHER PUBLICATIONS

20 Windows Tips For Users Old and New ; From system tools to the command prompt, we pave the way for smoother smarter windows computing. Neil J. Rubenking. PC Magazine. New York: Apr. 22, 2003. vol. 22, Iss. 7; p. M.007.*

* cited by examiner

*Primary Examiner*—Jeffrey A. Smith
*Assistant Examiner*—William J. Allen
(74) *Attorney, Agent, or Firm*—Hoffmann & Baron, LLP

(57) ABSTRACT

A method for identifying high-risk orders associated with a customer that includes the steps of: receiving an order that includes a customer number, an order type and a plurality of entries; identifying a customer contract based on the order type and the customer number, the customer contract having a plurality of terms that correspond to the entries; comparing the entries to corresponding terms using rules; and identifying a high-risk order containing at least one error from the comparison. The method can also include assigning a result code or a result text to the order, which corresponds to the errors that are identified, and changing the rule set by adding or removing rules.

20 Claims, 3 Drawing Sheets

```
03/05/04 16:13 ET    REVIEW ARCHIVE USO (OCS-SS IS)    PAGE 0001 OF 0012
(MA4OL30)      ORDER # 3604-1341-00   MERGED COPY      PAGE NUM ( ....)
                                              \              |
TOO=AA BILL DATE=31 SALES OFFICE=ND            14            12
BARDED ORDER TO=        ATTN=
COMP DATE=09-05-03
BARD DATE=09-06-03  EXC=
                                                      QUOTR
TN    CUS  CD    EX    APP                           _____ 16
      09-05-03  07-09-03 /ID 072803 12P              QUOTNR
ORD   CS   SLS   DD
      347KMBG 09-04-03
              _____ 18
TOO  AA              20
ID   070903 2P
ISC  N3604-1341-00A
SPO  MO/CPDD 07-03-03/CRDD 09-02-03
ACL  M
PRN  PL03083693BGXS
KIR  5Y10
AAID 5272301

ISIC 5045
                                                              22
---CTL                                                    _____
STS  BARBARA GORRES 812-934-0414
SID  07-10-03
EIRD 07-11-03  _____ 24
                                                          28
---BIL                                                _____
IPON N36041341 _____ 26                           30
IMCN 273550                                       _____
     /GRC ECS
     /SGC 01
IBN1 CISCO SYSTEMS/DEPT. 02003
...
```

FIG. 1 ated States Patent US 7,774,237 B1

METHODS FOR IDENTIFYING AND REVISING HIGH-RISK ORDERS BASED ON IDENTIFIED ERRORS

FIELD OF THE INVENTION

The present invention relates to a method for screening new orders for a customer and identifying those orders which have a high risk of containing errors. In particular, the method identifies orders which have a high risk of containing errors and initiates remedial action before the client is billed.

BACKGROUND OF INVENTION

Many service providers and suppliers of materials and goods have standing contracts with large customers, which outline the general terms under which they do business. These standing contracts are sometimes referred to as "blanket orders" and they refer to a contract between a vendor and a customer that is not line item specific. A standing contract is a means of setting aside a sum of money to a specific vendor that a company or an operating unit within the company may use on a recurring basis for services or consumable supplies over a specific period of time. Once the standing contract is in place, services and materials can be ordered against it, in accordance with an established policy. For example, a customer may have a standing contract with a telecommunications services provider under which orders are placed for expanding an existing system or provisioning a new facility.

In the normal course of business, orders are processed by personnel and systems where errors might be introduced. Any discrepancies between the order and the standing contract are not discovered until the customer is billed and finds that the order contains specific terms and provisions that differ from the standing contract. When this happens, there is a high likelihood that there will be a dispute regarding the terms of the contract and/or order and how much the customer should have to pay. This can lead to dissatisfied customers and the loss of future orders.

In order to avoid disputes with customers and identify high-risk orders before they become a problem, a system is needed that alerts management of orders that may potentially become a problem. The methods presently used for identifying high-risk orders do not adequately address the problem and do not provide a means for implementing preventive actions before an invoice is sent to a customer. Accordingly, there is a need for a method that screens new orders and compares them to existing contracts in order to ensure that the terms are in agreement.

SUMMARY OF THE INVENTION

In accordance with the present invention, a method is provided for identifying a high-risk order associated with a customer. The method includes the steps of: receiving an order that includes a customer number, an order type and a plurality of entries; identifying a customer contract based on the order type and the customer number, the customer contract having at least one term corresponding to the at least one entry; comparing the at least one entry to the at least one term; and identifying a high-risk order from the comparison. In another embodiment, the method includes the steps of: receiving an order that includes a customer number, an order type and a plurality of entries; identifying a customer contract based on the order type and the customer number, the customer contract having a plurality of terms, wherein at least one of the plurality of entries corresponds to one of the plurality of terms; comparing the entries to corresponding terms using rules; and identifying a high-risk order from the comparison. In both embodiments, the comparison identifies errors that would cause problems if the order were allowed to be processed without correction. If a customer contract is not identified, the processing of the order is discontinued.

The method for identifying high-risk orders can also include assigning at least one of a result code or result text to the order, wherein the result code or the result text corresponds to the at least one error that is identified. This information can then be sent to a customer care group, preferably by e-mail, where the order can be revised based on the result codes and/or result text. In a preferred embodiment, the comparison is done using rules which can be added, changed or removed. For example, when a customer's contract is amended or renewed. The rules can be structured for different types of orders that are processed by the same order entry system so that each order type has different rules, which are directed to specific terms in the contract. In a most preferred embodiment, the order is for telecommunication services and orders for different types of telecommunications services are processed using different rules.

The preferred embodiments of the method for identifying high-risk orders of the present invention, as well as other objects, features and advantages of this invention, will be apparent from the following detailed description, which is to be read in conjunction with the accompanying drawings.

BRIEF DESCRIPTION OF THE DRAWINGS

Other objects and many attendant features of this invention will be readily appreciated as the invention becomes better understood by reference to the following detailed description when considered in connection with the accompanying drawings wherein:

FIG. 1 is sample listing of order information entries which are checked using the method for identifying a high-risk order.

DETAILED DESCRIPTION OF THE PREFERRED EMBODIMENTS

Figure 2:
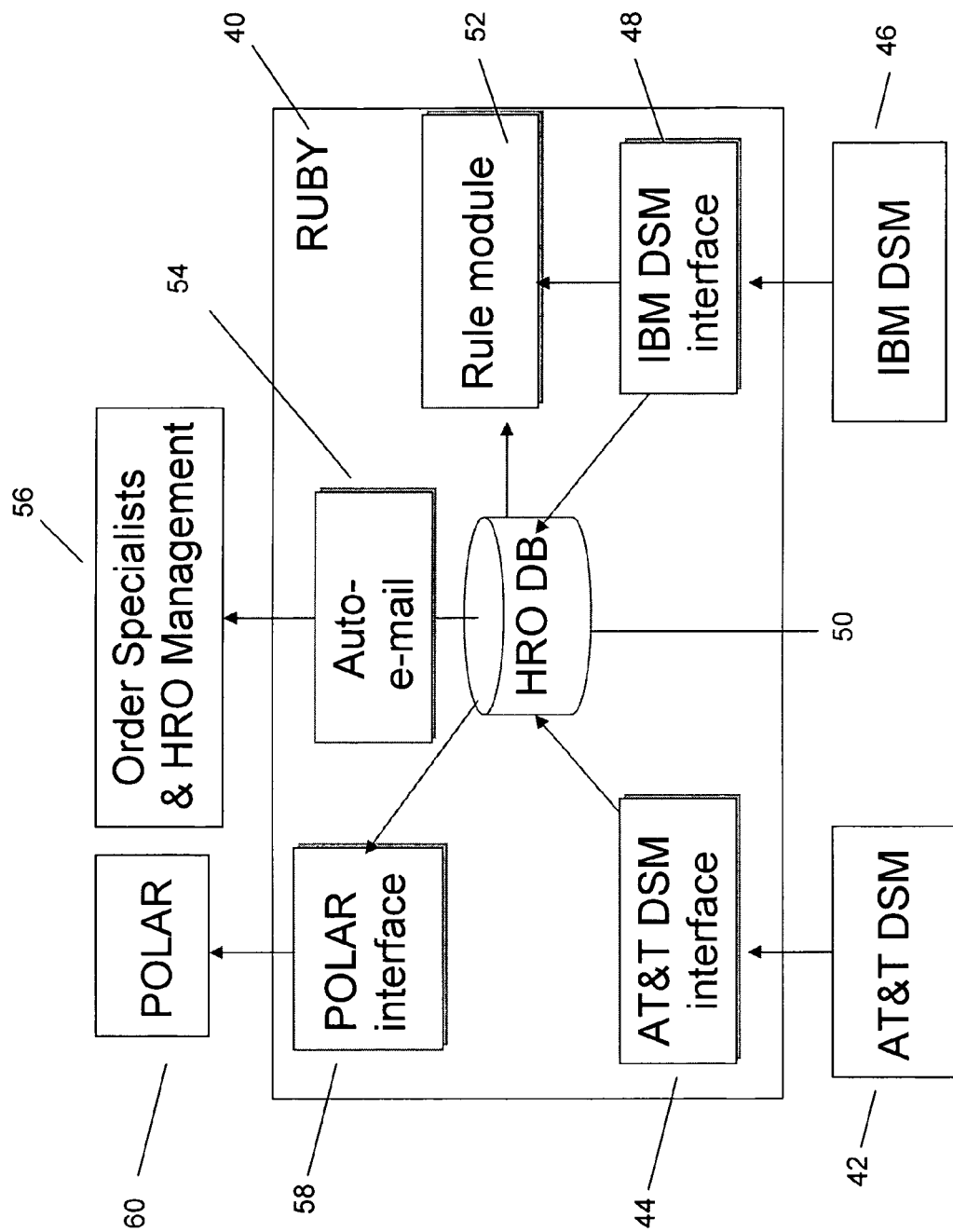
FIG. 2 is a schematic of the method for identifying a high-risk order.

The present invention is a method for screening new orders for customers that have a standing contract and identifying those orders which have a high risk of containing conflicting or incorrect order information entries.

In competitive businesses, such as the telecommunications industry, the strength of a company's services is a valuable asset. Accordingly, it is advantageous to identify high-risk orders and resolve them as soon as possible in order to maintain customer satisfaction. The present invention allows a service provider or the provider of goods and materials to proactively identify high-risk orders and address any problems before a customer becomes dissatisfied and complains.

Typically, the method of the present invention is intended to address the problem where a company sells services or goods based on terms and conditions set forth in a standing contract with a client or customer. For example, a telecommunications services provider may have a contract with a customer which does business on a national basis. If the customer expands operations at a facility or opens a new facility, it would contact the provider and place an order for telecommunications services. The order would be received and the information entered based on information entries made on the order. However, the order information entries may not be in accordance with the terms of the standing contract and the customer may be incorrectly billed. When the customer receives the bill, a dispute can arise, requiring customer care resources (i.e., the customer care group or customer services) to manually investigate and remedy the problem. Such disputes can damage the relationship with the customer and burden customer care centers with extra work. The present invention avoids these problems by screening incoming orders and comparing them to the customers' standing contracts in order to identify high-risk orders which may cause a dispute with the client.

The present invention proactively identifies high-risk orders, automatically retrieves the contract information and order information, and compares the terms and conditions in the standing contract to the information entered for the order to ensure that they are in agreement. When discrepancies are identified, an e-mail can be sent to the customer care specialist/services group to alert them of the existence of a potential high-risk order. This allows customer care/services to investigate the order and take any remedial action that may be necessary to resolve the problem before the bill is sent to the customer. One of the important features of the method for identifying high-risk orders is that it can be performed automatically (i.e., it is computer driven) and requires minimal or no intervention by customer care/services personnel.

The method for identifying high-risk orders reviews incoming orders placed by customers and identifies orders that are likely to contain errors and that have a high risk of causing problems if undetected. Order information relating to orders received from customers is entered into a database. The order information entries can include the client information and identification number and some or all of the terms of the order, such as pricing information, the type of service or goods ordered, features of the service or goods, delivery dates and payment terms. A computer-based system retrieves the order information from the database where it is stored and identifies the customer and the type of order, i.e., the specific type of goods and/or services covered by the order. The customer information is then used to identify a standing contract between the service provider or seller of goods and the customer.

The standing customer contract includes a plurality of contract terms, which correspond to a plurality of order information entries. The plurality of order information entries are compared to the plurality of contract terms to determine if they are in agreement. Preferably, the comparison is done using an established set of rules that are programmed into a computer and require the comparison of specific order information entries and contract terms. When the order information entries and the contract terms compared are not in agreement, the order is identified as a high-risk order. The comparison is used to generate high-risk order information, which includes a listing of the terms that are not in agreement. The high-risk order information associated with the customer order and the customer contract can then be sent to a customer care group, preferably by e-mail. The customer care group analyzes the high-risk order information and determines if an error has been made. The customer care group can then initiate action to remedy the high-risk order. In preferred embodiments, the method includes renegotiating or revising the order and/or the standing contract to resolve the high-risk order.

The order information and the standing contract information can be on the same database or on different databases. The computer or microprocessor automatically retrieves the order information and the contract information from the database(s) where they reside and compares certain order information entries and contract terms. In preferred embodiments, some of the terms of the contract can include a specified range so that a high-risk order would not be identified unless an order term were outside the specified range of the standing contract. For example, the pricing information in the standing contract may specify a price of from $20.00 to $25.00 per unit. Therefore, when the unit price in the contract is compared to the unit price in the order, the order would not be identified as a high-risk order if the unit price in the order is between $20.00 and $25.00 per unit. However, if the unit price is $19.00 per unit, the order would be identified as a high-risk order and customer service would be notified.

A preferred application of the method of the present invention is for identifying high-risk orders for telecommunication services which are placed with a telecommunications services provider. The standing customer contracts can include terms relating to the Universal Service Order Code ("USOC"), Class of Service, Plan Identification ("PLID") and waiver combinations, which must be entered on an order so that the different features provided to the customer can be correctly billed. Errors made, when this information is entered on an order, are often not caught until the customer receives an incorrect bill. The method of the present invention identifies orders with a potential risk of having errors (i.e., high-risk orders) by checking new order information entries which have historically caused problems against the terms of a standing contract. High-risk orders are identified and a billing specialist in the customer care group can be notified so that corrective action can be taken before the completion of the order. This prevents an incorrect bill from being sent to the customer.

The method for identifying high-risk orders is used to review new orders from customers and identify high risk or problem orders. The method classifies and validates the new orders by comparing the order information entries in the new orders to existing customer information and the terms of existing customer contracts. In a preferred embodiment, the method classifies orders as "Ignored," "Good Order" or "Order with Errors." For each order, the method produces a result code (i.e., an alphanumeric code assigned to indicate the status of the order) and a result text (e.g., "Ignored-Disconnect Order," "Good Order," "Invalid ISDN circuit suffix is XXX"). For cases where multiple errors are identified, multiple result codes and texts are produced.

FIG. 1 shows a service order 10 for a telecommunications systems provider and it includes information on order type 12, order number 14, issue date 16, main section 18 with segments 20, control section 22 with segments 24, billing section 26 with segments 28 and floating fields 30. Each section can consist of many section segments which can include many floating fields (prefixed with a slash, "/"). There are a variable number of segments and fields with interdependency. Some orders have more than 100 segments/fields and each of them can have many possible values. Therefore, the input space is on the order of 2**100.

The method for identifying high-risk orders classifies orders using established rules to review new orders. The rules are different for different types of orders and they address information entries in the orders that have caused problems in the past. These rules can be periodically supplemented to reflect newly identified problems encountered during the processing of orders. The rules are directed to various order information entries that may be incorrectly entered and check the entries to determine if a problem exists. As additional potential errors are identified, rules are added to the method for checking the information relating to the potential errors. Preferably, the rules are loaded into the RUBY platform in order to take advantage of its reusable rule based automation capability (e.g., rule building, testing, deployment and execution environment) so that rules can be added, modified and deployed quickly (e.g., weekly) as the knowledge grows.

A preferred embodiment of the invention is a method for checking high-risk orders entered with a telecommunications systems provider. A telecommunications services order has many key attributes (e.g., order number, issue date, order type, receive date), many section segments (e.g., SLS (sales code), NCON (negotiation contact—i.e., the order specialist), MCN (master customer number, PLID (plan identification), CS (class of service), USOC (universal service order code)) and many floating fields (e.g., /CAN (cancelled order), /RJA (rate jurisdiction and authorization), /PRMO (promotional codes), /WAC (waive all charges)). They are used in the high-risk order identification processing. For example, to classify an order into WATS order type based on order number within certain range.

A customer can have many MCNs (Master Customer Numbers). For each MCN, the customer may have many contracts of different contract types (e.g., voice or data). The profile information identifies valid customers based on MCN, contract number and contract type relationships. The MCN is used for retrieving orders for a particular customer, while the later is used to drop an order from the processing process if it does not have an identifiable contract associated with it.

The contract information contains tables that describes key segment or field combinations that are legitimate. For example, for a given contract number and a class of service, only a specific plan identification (PLID) is legitimate. The rules module in RUBY uses this contract information to detect an invalid PLID value on an order. The order validation output contains the result codes and result text of each validated order. For each order number, there can be multiple result codes and result texts.

Figure 3:
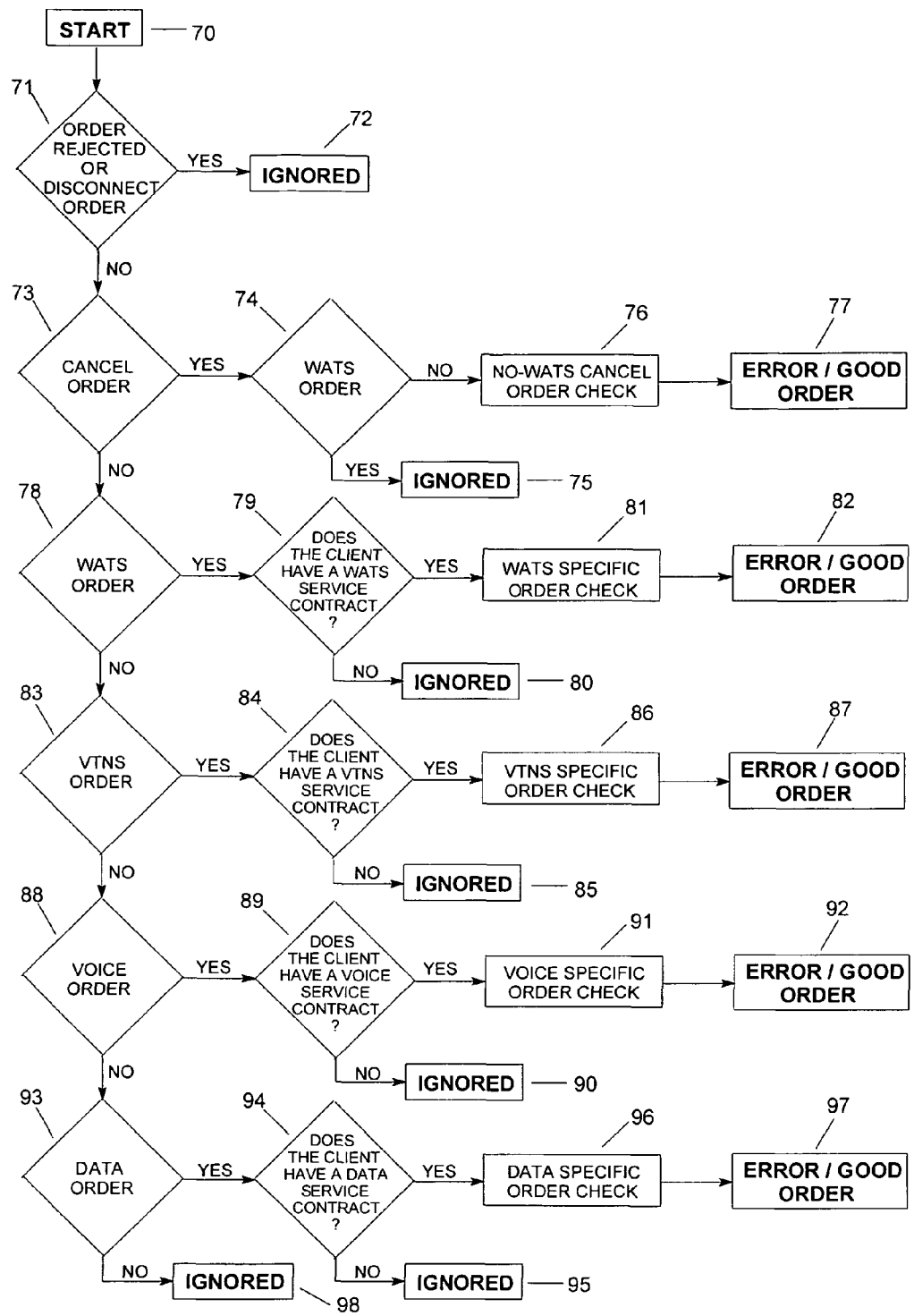
FIG. 3 is flow chart of the method for identifying a high-risk order.

FIG. 3 shows a flow chart of an embodiment of the present invention that is used for identifying high risk service orders received by a telecommunications systems provider. If a received order is reviewed and found to be a rejected order or a disconnect order, an "Ignored" result code is assigned to the order and stored in the HRO (high-risk order) database (item 50 in FIG. 2). Otherwise, if it is a non-WATS cancel order, various order entries (e.g., USOC, WAC) are checked to ensure that the proper cancel charge is applied. For a WATS cancel order, an "Ignored" result code is assigned and stored. The rest of the processing is organized by the order type (i.e., WATS, VTNS (virtual telecommunication network services), Voice, Data).

Each order type has its own specific rules for checking the order. All of the rules start with checking whether the order has a valid contract. If the contract number is not found in the database, an "Ignored" classification is assigned to the order. Otherwise, specific types of rules are applied to each order to see whether it is a "Good Order" or in "error."

FIG. 2 is a schematic of a preferred embodiment of the present invention and it shows the RUBY (Rules Builder for Yourself) program/system 40 that is used by AT&T to identify high-risk orders. RUBY 40 retrieves contract information from the AT&T DSM (Data Service Manager) system 42 through the AT&T DSM Interface 44. The AT&T DSM Interface 44 retrieves profile and contract information from the AT&T DSM system 42 at regular intervals, preferably weekly. The information retrieved is then normalized and stored in the HRO DB 50 (High-risk order Database).

RUBY 40 also retrieves pending order information from the IBM/DSM system 46 (i.e., the IBM data service manager) where it is stored through the IBM/DSM Interface 48. The IBM/DSM Interface 48 retrieves all pending orders associated with a master customer number (MCN) from the IBM DSM system 50 daily for each MCN stored in the HRO DB 50. The orders retrieved are normalized and stored in HRO DB 50. In addition, for each order stored, a short order event message is sent to rule module 52 to trigger the processing of the order.

The HRO DB 50 provides persistency (i.e., the contents of the database is stored in a medium that will not be lost if the system crashes) to key information used in the high-risk order identification processing. HRO DB 50 stores order information; profile and contract information; order validation results; and notification e-mail addresses.

After the contract and order information are retrieved, the RUBY program 40 compares the order information entries with the terms of the contract using a different set of rules for different types of orders. The results of the comparison are sent to POLAR Interface 58 which communicates with the interface for the user interface system, which AT&T refers to as POLAR 60. POLAR 60 provides a means for the information generated by the RUBY program 40 to be made available through AT&T's network. In addition, a processing summary of the customer orders and the comparison with the customer contracts can be made available to management in the form of raw data or formatted reports through the POLAR Interface 58.

The name of the Order Specialist 56 that writes an order is entered as part of the order information. Using the name of the Order Specialist 56, the system can identify his or her e-mail address from a table in the system. The name and e-mail address of the Order Specialist 56 can also be retrieved based on the sales code (SC) or network configuration manger (NCON) code associated with the Order Specialist. Using this information, auto-e-mail system 54 sends a message to the Order Specialist 56 when a high-risk order is identified and the Order Specialist 56 can take the necessary remedial actions, including correcting the order.

The Rule module 52 applies rules to each order that is received according to the type of order. FIG. 3 is a flow chart which shows an example of how a set of rules is applied to a new order. The application of the high-risk order rules begins at START in step 70 when an order is received by RUBY. In step 71, the rules check to determine if the order has any missing or incorrectly entered information and to determine if the order is a "disconnect order," i.e., an order from a customer to disconnect circuits that are no longer needed. If the order is rejected or is a disconnect order, it is classified as "ignored" in step 72 and will not be processed any further by the RUBY program.

If the order is not rejected and it is not a disconnect order, the program proceeds to step 73 where it is determined whether or not the order is a "cancel order." If it is a cancel order, the rules check to determine if it is a WATS (wide-area telephone service) order in step 74. If it is a WATS order, it is classified as "ignored" in step 75. If it is not a WATS order, the rules perform a no-WATS cancel order check in step 76 to determine if the order has been cancelled. If the order has been cancelled it is classified as an "error" and if the order has not been cancelled, it is classified as a good order in step 77.

If it is determined in step 73 that the order is not a cancel order, the program proceeds to step 78 where the order is checked to determine if it is a WATS order. If it is a WATS order, the rules check in step 79 to determine if the client or customer has a contract for WATS orders. If the client does not have a contract relating to WATS service, the order is classified as "ignored" in step 80. If the client does have a contract relating to WATS service, the rules compare the order information entries with the contract terms in 81. The comparison determines whether there are any errors in the order that would cause it to be classified as a high-risk order or if the order is free of errors and is a good order. The order is then classified as an "error/good order" in step 82.

If the order is determined not to be a WATS order in step 78, the rules check to determine if the order is a VTNS (Virtual Telecommunication Network Services) order in step 83. If it is a VTNS order, the rules check in step 84 to determine if the client has a contract for VTNS orders. If the client does not have a contract relating to VTNS service, the order is classified as "ignored" in step 85. If the client does have a contract relating to VTNS service, the rules compare the order information entries with the contract terms in 86. The comparison determines whether there are any errors in the order that would cause it to be classified as a high-risk order or if the order is free of errors and is a good order. The order is then classified as an "error/good order" in step 87.

If the order is determined not to be a VTNS order in step 83, the rules check to determine if the order is a VOICE (i.e., voice telecommunication services) order in step 88. If it is a VOICE order, the rules check in step 89 to determine if the client has a contract for VOICE orders. If the client does not have a contract relating to VOICE service, the order is classified as "ignored" in step 90. If the client does have a contract relating to VOICE service, the rules compare the order information entries with the contract terms in 91. The comparison determines whether there are any errors in the order that would cause it to be classified as a high-risk order or if the order is free of errors and is a good order. The order is then classified as an "error/good order" in step 92.

If the order is determined not to be a VOICE order in step 88, the rules check to determine if the order is a DATA (data telecommunication services) order in step 93. If it is a DATA order, the rules check in step 94 to determine if the client or customer has a contract for DATA orders. If the client does not have a contract relating to DATA service, the order is classified as "ignored" in step 95. If the client does have a contract relating to DATA service, the rules compare the order information entries with the contract terms in 96. The comparison determines whether there are any errors in the order that would cause it to be classified as a high-risk order or if the order is free of errors and is a good order. The order is then classified as an "error/good order" in step 97.

If the order is determined not to be a DATA order in step 93, the order is classified as "ignored" in step 98. In other embodiments, the RUBY program can be structured to check the order for errors in other order information entries using additional rules. The program is structures so that new rules can be easily added to RUBY at any time.

EXAMPLES

The examples set forth below serve to provide further appreciation of the invention but are not meant in any way to restrict the scope of the invention.

Example 1

The rule in this example is a VTNS specific rule for detecting a USOC (Universal Service Order Code) entry problem. For this rule, when a specific customer (designated as "customer XXX") with a MCN (the master customer number is designated as "YYY") is identified then the order must be for at least one type of service (these services are USOC ADJUT and USOC ADJAV—where ADJUT and ADJAV are codes for specific types of services) that is always associated with this customer's orders. The rule states:
—If an order is a VTNS order and belongs to customer XXX and the MCN number is YYY, then it must have USOC ADJUT or USOC ADJAV.—
When this rule is violated, the following codes and texts are produced for the order:

| | |
|---|---|
| Result code: | 300820 |
| Result text: | AVA USOC (ADJUT or ADJAV) missing from order. |

The acronym "AVA" in the result text is short for Access Value Arrangement.

Example 2

The rule in this example is WATS order specific and specific with regard to the customer. The rule requires that if the order is for WATS service, it must have a valid contract number and a valid plan identification number. The rule states:
—If an order is a WATS order, then it should have valid contract number and PLID combination.—
The following codes and texts are produced when the rule is violated:

| | |
|---|---|
| Result code: | 200200 |
| Result text: | Wrong PLID ZZZZ. PLID should be XXXX. |

Example 3

The rule in this example is ISDN (Integrated Services Digital Network) order specific and generic with regard to the customer. In this case, PRI is a specific type of circuit that is used with an ISDN and this circuit is always identified with a code that begins with "KZET" as the prefix and ends with "24" as the suffix. Therefore, if the circuit designation begins with "KZET" and does not end with "24," there is an error in the entry of order information.
—If an order is an ISDN PRI order, then the suffix of those circuits with KZET prefix should end with 24.—
The following codes and texts are produced when the rule is violated,

| | |
|---|---|
| Result code: | 300800 |
| Result text: | Invalid ISDN circuit suffix is XXX. |

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

The invention claimed is:

1. A method for identifying a high-risk order associated with a customer by using a computer or microprocessor to perform the steps of the method, the method comprising:
receiving an order comprising a customer number, an order type and at least one entry;
entering the customer number, the order type and the at least one entry into a database;
identifying a customer contract based on the customer number and the order type, the customer contract comprising at least one term corresponding to the at least one entry, wherein the at least one term of the customer contract has a range with a low limit and a high limit;

retrieving customer contract information from the database;

comparing, by a computer, the at least one entry to the at least one term, wherein the comparison identifies at least one error in response to determining that the at least one entry is outside of the range between the low limit and high limit;

identifying a high-risk order based on the comparison;

assigning at least one of a result code or a result text to the order, wherein the result code or the result text corresponds to the at least one error that is identified; and revising the order based on the result code or the result text.

2. The method for identifying high-risk orders according to claim 1, further comprising discontinuing the processing of the order if a customer contract is not identified.

3. The method for identifying high-risk orders according to claim 1, further comprising sending the high-risk order information to a customer care group.

4. The method for identifying high-risk orders according to claim 3, wherein the high-risk order information is sent by e-mail.

5. The method for identifying high-risk orders according to claim 1, wherein the order is for telecommunication services.

6. The method for identifying high-risk orders according to claim 5, wherein the comparison is done using rules.

7. The method for identifying high-risk orders according to claim 6, wherein each order type has different rules.

8. A method for identifying high-risk orders associated with a customer by using a computer or microprocessor to perform the steps of the method, the method comprising:

receiving an order comprising a customer number, an order type and a plurality of entries;

entering the customer number, the order type and the plurality of entries into a database;

identifying a customer contract based on the order type and the customer number, the customer contract comprising a plurality of terms, wherein each term has a range with a low limit and a high limit and wherein at least one of the plurality of entries corresponds to one of the plurality of terms;

retrieving customer contract information from the database;

comparing, by a computer, the entries to corresponding terms using rules, wherein the comparison identifies at least one error in response to determining that at least one of the plurality of entries is outside of the range of one of the plurality of terms;

identifying a high-risk order from the comparison;

assigning at least one of a result code or a result text to the order, wherein the result codes or the result text corresponds to the at least one error that is identified; and revising the order based on the result code or the result text.

9. The method for identifying high-risk orders according to claim 8, further comprising discontinuing the processing of the order if a customer contract is not identified.

10. The method for identifying high-risk orders according to claim 8, further comprising sending the high-risk order information to a customer care group.

11. The method for identifying high-risk orders according to claim 10, wherein the high-risk order information is sent by e-mail.

12. The method for identifying high-risk orders according to claim 8, further comprising initiating action to remedy the high-risk order.

13. The method for identifying high-risk orders according to claim 8, further comprising revising the rules.

14. The method for identifying high-risk orders according to claim 8, wherein each order type has different rules.

15. A method for identifying a high-risk order for telecommunication services associated with a customer by using a computer or microprocessor to perform the steps of the method, the method comprising:

receiving an order comprising a customer number, an order type and at least one entry;

entering the customer number, the order type and the at least one entry into a database;

identifying a customer contract based on the customer number and the order type, the customer contract comprising at least one pricing term corresponding to the at least one entry, wherein the at least one pricing term of the customer contract has a range with a low limit and a high limit;

retrieving customer contract information from the database;

comparing, by a computer, the at least one entry to the at least one pricing term, wherein the comparison identifies at least one error in response to determining that the at least one entry is outside of the low limit and high limit range of the at least one pricing term;

identifying a high-risk order from the comparison;

assigning at least one of a result code or a result text to the order, wherein the result codes or the result text corresponds to the at least one error that is identified; and revising the order based on the result code or the result text.

16. The method for identifying high-risk orders according to claim 15, further comprising classifying orders based on the comparison.

17. The method for identifying high-risk orders according to claim 16, wherein the orders are classified as "Ignored," "Good Order" or "Order with Errors."

18. The method for identifying high-risk orders according to claim 15, wherein the comparison is done using rules.

19. The method for identifying high-risk orders according to claim 18, wherein each order type has different rules.

20. The method for identifying high-risk orders according to claim 15, further comprising sending the high-risk order information to a customer care group.

* * * * *